Edmund C. Jackson,
INVENTOR.

BY.

Noel B. Hammond

AGENT.

2,995,994
Patented Aug. 15, 1961

2,995,994
PHOTOGRAPHIC PRINT COATER AND UNCURLER FOR A SELF-DEVELOPING CAMERA
Edmund C. Jackson, 226 Via Pasqual, Hollywood Riviera, Redondo Beach, Calif.
Filed June 14, 1960, Ser. No. 36,044
1 Claim. (Cl. 95—13)

The present invention relates to equipment for use with cameras, and more particularly, to a device for facilitating the uncurling of a photographic print and the application of a protective coating thereto after the print is developed in a self-developing camera.

When using a camera of the type which develops and prints a finished photograph in the camera immediately after exposure of the film, it is necessary to coat the photographic print with a preservative substance which makes the image permanent and protects the print from damage. It is important that the print be coated immediately after it is developed to prevent deterioration of the image, particularly under humid conditions. In addition, it is desirable that the curl of the photographic print be removed so that it will lie flat.

Such cameras may be used at any location, either indoors or outdoors and, frequently, the prints are developed at a location in which it is inconvenient to uncurl the print and apply the protective coating. If done out of doors, where no facilities are available, it is necessary to locate a straightedge over which to draw the print several times to remove the curl; to locate a clean, flat surface on which to place the print while applying the coating; and to find a safe repository for the camera while the print is being treated.

The expedient procedure is to hold the camera between the knees, draw the print over one edge of the camera-well access door with both hands until it is substantially flat, and then to hold the print against the flat rear surface of the camera with one hand while applying the preservative coating with the other hand. This process is awkward and inconvenient and, in addition, subjects the rear surface of the camera to the residue of the preservative substance. If the process is performed indoors, care must be taken that the preservative substance which is used to coat the print is not permitted to damage household furnishings.

Accordingly, it is an object of the present invention to provide a device that facilitates the uncurling of a photographic print and the application of a protective coating thereto.

Another object of the invention is the provision of a device with which a photographic print may be uncurled and coated with a preservative substance simultaneously.

Yet another object of the present invention is to provide a device with which a photographic print may be uncurled and coated with a preservative substance in a convenient manner.

A further object of the invention is the provision of a device for use in uncurling a photographic print and applying a protective coating thereto, that is simple, inexpensive and easy to manufacture.

In accordance with these and other objects of the invention, a device is provided that may be easily attached to a self-developing camera and that makes readily available everything necessary for the uncurling and coating of a photographic print. The device does not interfere with the normal operation of the camera in any way, and by its use a print may be simultaneously uncurled and coated with one hand while holding the camera with the other hand.

According to an embodiment of the present invention, the device attaches to the camera without modification thereof by means of a projection that fits beneath a band on the camera for securing one end of a carrying strap and a mounting screw which threads into a tripod mounting hole, also already provided on the camera. The mounting screw may be easily turned with a coin so that the device may be readily attached to and removed from the camera, as desired, without requiring the use of a special tool. The device embodying the present invention is formed in a manner such that it does not interfere with the placement of the camera, in the space provided for it, in the camera carrying case with the device fastened in place. Furthermore, the head of the mounting screw which secures the device to the camera is drilled and tapped to the exact thread size and depth as the original tripod mounting hole in the camera so that a tripod may be used even when the device is fastened to the camera.

In accordance with the invention, the device includes a ridge that forms a straightedge and means for holding a wiper that is supplied with the film and is impregnated with a preservative substance. The wiper is arranged such that the print is coated with the preservative substance at the same time the curl is being removed. A cover prevents evaporation of the coating material from the wiper when the device is not being used.

The following specification and the accompanying drawing respectively describe and illustrate an exemplification of the present invention. Consideration of the specification and the drawing will provide an understanding of the invention, including the novel features and objects thereof. Like reference characters are used to designate like parts throughout the figures of the drawing.

Figure 1:
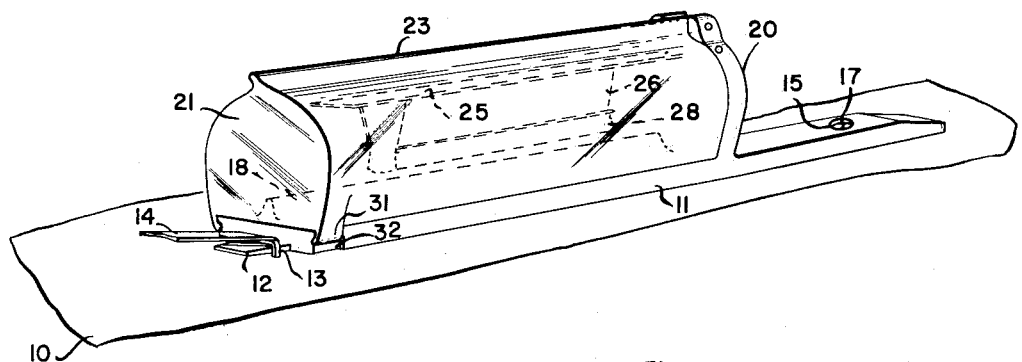
FIG. 1 is a perspective view of an embodiment of a photographic print coater and uncurler in accordance with the invention with the cover closed and mounted on a camera.
Figure 2:
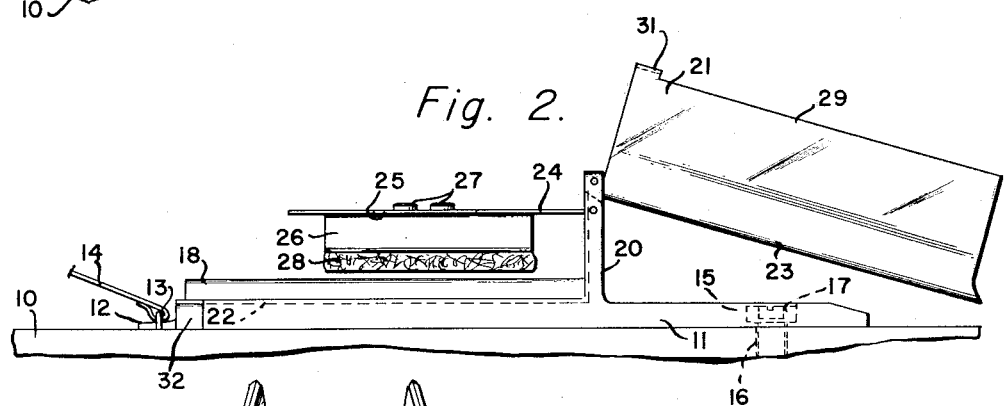
FIG. 2 is a side view of the photographic print coater and uncurler of FIG. 1 with the cover open.

Referring now to FIG. 1 of the drawing, an exemplary embodiment of a device for coating and uncurling a photographic print in accordance with the invention is shown fastened to a camera 10. A longitudinal base 11 extends along one side of the camera 10 and one end is shaped into a tongue 12 that projects beneath a band 13 provided on the camera 10 for securing one end of a carrying strap 14. The base 11 is provided with a recessed hole 15 in registry with a threaded hole 16 provided in the camera 10 for the attachment of a tripod. The base 11 is fastened to the camera 10 by a screw 17 provided with a slot of such dimensions that it may be readily turned with a coin, the screw 17 passing through the recessed hole 15 in the base 11 and engaging the threads of the threaded hole 16 in the camera 10. The top of the head of the screw 17 is flush with the outer surface of the base 11. The head of the screw 17 is drilled and tapped so that a tripod may be used even when the base 11 is fastened to the camera 10.

The base 11 is provided with a raised ridge 18 extending longitudinally along the center of the base 11 and having an arcuate outer edge. The ridge 18 serves both as a straightedge for uncurling photographic prints and as a surface against which the coating of the prints may be performed. The ridge 18 has a length slightly longer than width of the photographic prints to be treated. The ridge 18 extends from a point adjacent the tongue 12 of the base 11 toward the recessed hole 15. At the end of the ridge 18 proximate to the recessed hole 15 a support 20 extends outward from the base 11. The support 20 extends across to the long dimension of the base 11 and is of an arcuate, generally horseshoe shape. Pivoted to the support 20 at the outer end, or end distal from the base 11, is a cover 21.

The cover 21 may be made of a plastic material and extends from the support 20 to the end of the base 11 adjacent the tongue 12. The cover 21 is hollow and is open on the surface that is closest to the base 11 and on the surface adjacent the support 20 so that in the closed position, the cover 21 encloses all of the outer surface of the base 11 coextensive with the ridge 18 from the support 20 to the end of the base 11 adjacent the tongue 12. The base 11 is provided with a V groove 22 along the outer longitudinal edges thereof and across the end adjacent the tongue 12. The support 20 is also provided with a V groove 22 around the edge adjacent the cover 21. The cover 21 is provided with a V projection 29 around the edges of the opening therein so that when the cover 21 is in the closed position, the V projection 29 engages the V groove 22 to seal the enclosed volume against entry of air.

The cover 21 is provided with a pair of flat projections 31 on either side thereof at the end distal from the support 20. The projections 31 extend below the edge of the cover 21 and engage depressions 32 provided in the side of the base 11 when the cover 21 is in the closed position. The projections 31 snap into the depressions 32 to maintain the cover 21 in the closed position. The cover 21 is also provided with a peak 23 on the outer surface thereof that extends from the support 20 to the other end of the cover 21 for use as an auxiliary straightedge for further uncurling of the photographic prints.

A flat bar 24 is pivoted to the support 20 immediately below the pivot point of the cover 21 and normally extends above and parallel to the base 11 coextensive with the ridge 18. The bar 24 is provided with a longitudinal slot 25 to which is slidably attached a retainer 26, as by rivets 27. The retainer 26 may be a piece of sheet metal formed to securely clasp a wiper 28 which is made of cotton or other absorbent material and is impregnated with a preservative substance. The wiper 28 is supplied, already impregnated, with the film for a self-developing camera. The wiper 28, when held by the retainer 26, is normally disposed above and parallel with the ridge 18 of the base 11 and is slidable therealong and may be pressed thereagainst by finger pressure on the rivets 27.

Figure 3:
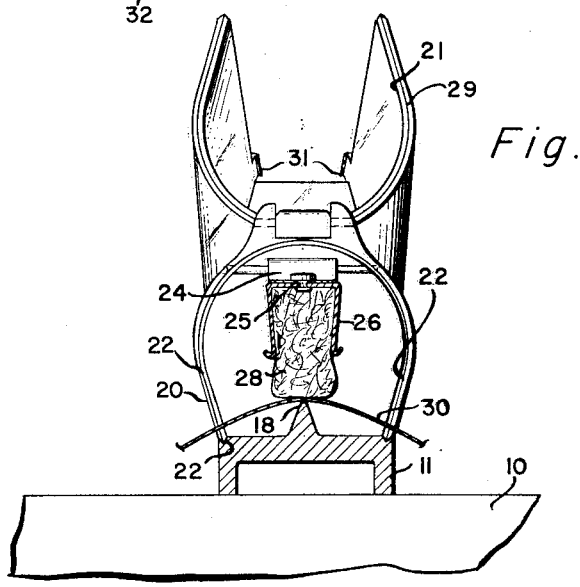
FIG. 3 is a sectional front view of the photographic print coater and uncurler showing a photographic print being treated.

In operation, the camera 10 is held with one hand, the fingers being under the carrying strap 14 and the thumb being adjacent the device of the present invention. The cover 21 is pivoted up and away from the base 11, and the photographic print 30 (FIG. 3) is removed from the camera 10. The bar 24 supporting the retainer 26 and the wiper 28 is also pivoted up and away from the base 11. The print 30 is then placed on the base 11 against the ridge 18. The bar 24 is then lowered toward the base 11, bringing the wiper 28 in contact with the print 30. The print 30 is drawn between the wiper 28 while the wiper 28 is urged toward the ridge 18 by the pressure of the thumb. The print 30 is drawn down over the ridge 18 and toward the camera 10 to apply a reverse curl to the print 30, thereby uncurling it. By movement of the thumb on the rivets 27, the retainer 26 is moved in the slot 25 to cause the wiper 28 to contact all of the surface of the print 30. After the print 30 has been coated, it is removed from the device and the cover 21 is closed. If any residual curl remains in the print 30, it may be drawn several times over the peak 23 on the cover 21 until it is flat.

Thus, there has been described a device for use with a self-developing camera that facilitates the simultaneous coating and uncurling of a photographic print in a convenient manner, the device being simple, inexpensive and easy to manufacture.

What is claimed is:

Apparatus for use with a self-developing camera for applying a preservative coating to a photographic print and for producing a reverse curl therein, said apparatus comprising: a longitudinal base adapted to extend along one side of a camera, the camera having a band for securing one end of a carrying strap and having a threaded hole for the attachment of a tripod, one end of said base being shaped to fit beneath the band of the camera and the other end of said base being provided with a recessed hole in registry with the threaded hole of the camera, said base having a sealing surface on the side away from the camera along the outer longitudinal edges thereof and across one end; a support extending outward from said base and having a sealing surface along the outer edge of one side thereof; a hollow longitudinal cover having a longitudinal opening and being pivoted at one end to the distal end of said support, the edges of said cover being provided with a sealing surface arranged to engage the sealing surface of said base and of said support; said cover being provided on the outer surface with a longitudinal peak extending from the distal end of said support; a bar mounted at one end to said support at a point between said cover and said base and having a position extending above and along said base; said bar having a longitudinal slot, and a retainer slideably mounted in said slot; said base having a raised ridge extending lengthwise thereof below said retainer; said retainer being adapted to receive an absorbent wiper impregnated with a preservative substance in a position above and coextensive with the raised ridge in said base.

References Cited in the file of this patent
UNITED STATES PATENTS 2,950,664     Stolier _____ Aug. 30, 1960